(12) United States Patent
Sheem et al.

(10) Patent No.: US 9,450,248 B2
(45) Date of Patent: Sep. 20, 2016

(54) ACTIVE MATERIAL FOR RECHARGEABLE LITHIUM BATTERY AND RECHARGEABLE LITHIUM BATTERY INCLUDING THE SAME

(75) Inventors: Kyeu-Yoon Sheem, Suwon-si (KR); Sang-Min Lee, Suwon-si (KR); Min-Seok Sung, Suwon-si (KR); Wan-Uk Choi, Suwon-si (KR); Young-Hee Lee, Suwon-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 1695 days.

(21) Appl. No.: 12/289,756

(22) Filed: Nov. 3, 2008

(65) Prior Publication Data

US 2009/0142665 A1 Jun. 4, 2009

(30) Foreign Application Priority Data

Nov. 22, 2007 (KR) .................. 10-2007-0119893

(51) Int. Cl.
| | |
|---|---|
| H01M 10/00 | (2006.01) |
| H01M 4/62 | (2006.01) |
| H01M 4/36 | (2006.01) |
| H01M 4/38 | (2006.01) |
| H01M 4/485 | (2010.01) |
| H01M 4/505 | (2010.01) |
| H01M 4/525 | (2010.01) |
| H01M 4/58 | (2010.01) |
| H01M 10/052 | (2010.01) |

(52) U.S. Cl.
CPC ............. *H01M 4/625* (2013.01); *H01M 4/366* (2013.01); *H01M 4/38* (2013.01); *H01M 4/485* (2013.01); *H01M 4/505* (2013.01); *H01M 4/525* (2013.01); *H01M 4/5825* (2013.01); *H01M 10/052* (2013.01); *Y02E 60/122* (2013.01)

(58) Field of Classification Search
CPC .................................................... H01M 4/366
USPC ........................ 252/500; 429/212, 213, 217
See application file for complete search history.

(56) References Cited

U.S. PATENT DOCUMENTS

| | | | |
|---|---|---|---|
| 8,105,716 B2 * | 1/2012 | Sheem et al. ............... | 429/231.8 |
| 2005/0006623 A1 * | 1/2005 | Wong et al. .................... | 252/70 |
| 2005/0087726 A1 * | 4/2005 | Anazawa et al. ............. | 252/500 |
| 2007/0111101 A1 * | 5/2007 | Ohkubo et al. ................ | 429/232 |
| 2008/0160409 A1 * | 7/2008 | Ishida et al. .................. | 429/220 |

FOREIGN PATENT DOCUMENTS

| | | | | |
|---|---|---|---|---|
| KR | 100566028 B1 | 3/2006 | | |
| KR | 1020070051667 A | 5/2007 | | |
| KR | 2007056765 | * | 6/2007 | ............. H01M 4/02 |
| KR | 1020070088534 A | 8/2007 | | |

* cited by examiner

*Primary Examiner* — Peter Keyworth
(74) *Attorney, Agent, or Firm* — Robert E. Bushnell, Esq.

(57) ABSTRACT

An active material for a rechargeable lithium battery is provided with a non-carbon-based material on which nano-fiber-shaped carbon having an oxygen-included functional group is grown. The negative active material for a rechargeable lithium battery has good conductivity and cycle life characteristics.

18 Claims, 4 Drawing Sheets

FIG. 1A
FIG. 1B
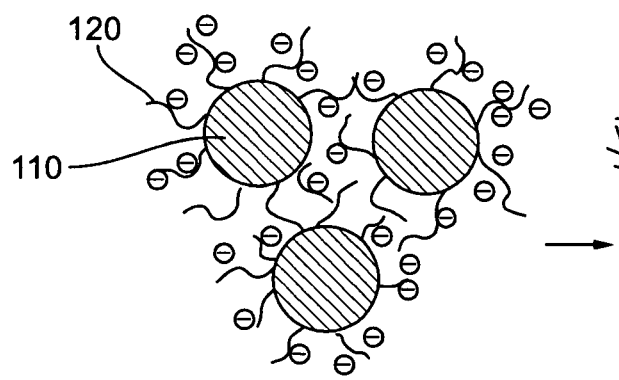
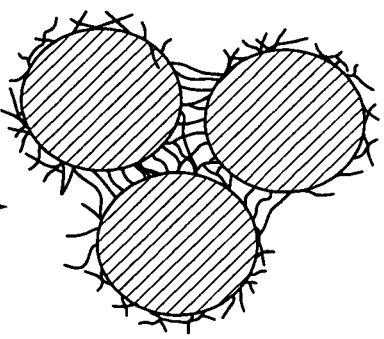
FIG. 2A
FIG. 2B
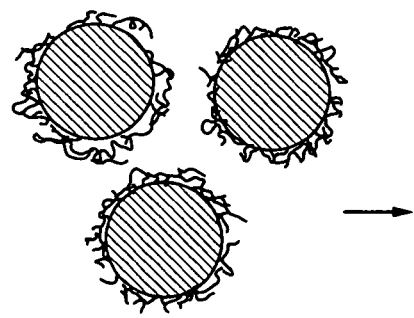
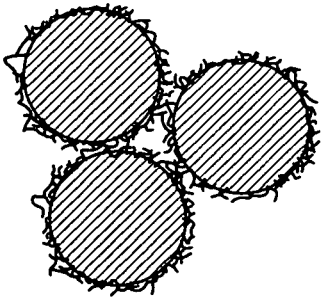

ACTIVE MATERIAL FOR RECHARGEABLE LITHIUM BATTERY AND RECHARGEABLE LITHIUM BATTERY INCLUDING THE SAME

CLAIM OF PRIORITY

This application makes reference to, incorporates the same herein, and claims all benefits accruing under 35 U.S.C. §119 from an application earlier filed in the Korean Intellectual Property Office on 22 Nov. 2007 and there duly assigned Serial No. 10-2007-0119893.

BACKGROUND OF THE INVENTION

1. Field of the Invention

The present invention relates to an active material for a rechargeable lithium battery and a rechargeable lithium battery including the same. More particularly, the present invention relates to an active material for a rechargeable lithium battery having excellent cycle-life characteristics and high electric conductivity and a rechargeable lithium battery including the same.

2. Description of the Related Art

Lithium rechargeable batteries have recently drawn attention as a power source of small portable electronic devices. The rechargeable lithium batteries use an organic electrolyte solution and thereby having twice the discharge voltage of a contemporary battery using an alkali aqueous solution. Accordingly, the rechargeable lithium batteries have high energy density.

A battery unit of a conventional lithium secondary battery includes a plurality of positive and negative electrode plates, and a separator interposed between the electrode plates. The battery unit is wound in a jelly-roll type in which a positive electrode plate, a separator and a negative electrode plate are sequentially disposed.

Each of the positive and negative electrode plates includes an electrode current collector and an electrode active material layer coated on the surface of the electrode current collector.

For positive active materials of a rechargeable lithium battery, lithium-transition element composite oxides being capable of intercalating lithium, such as $LiCoO_2$, $LiMn_2O_4$, $LiNi_{1-x}Co_xO_2$ (0<x<1), and so on, have been researched.

For negative active materials of a rechargeable lithium battery, various carbon-based materials such as artificial graphite, natural graphite, and hard carbon, all of which can intercalate and deintercalate lithium ions, have been used. Recently, non-carbon-based negative active materials have been actively researched.

Since the non-carbon-based negative active material, such as Si, has low conductivity, research on improving the conductivity of non-carbon-based negative active material has been actively undertaken. For example, a method for growing carbon nanotubes or carbon nanofibers on the surface of Si has been researched. The carbon nanotubes or carbon nanofibers have a problem, however, that the carbon nanotubes and carbon nanofibers have a very large specific surface area and a strong Van der Waals force, and thus the carbon nanotubes and carbon nanofibers tend to tangle easily. In addition, the carbon nanotubes or carbon nanofibers are made from a graphite mesh with well developed crystallinity, and thereby having a very strong hydrophobic property.

The carbon nanotubes and carbon nanofibers are very strongly hydrophobic, have a very small size of several to tens of nanometer (nm), and are grown on the surface of an active material. The carbon nanotubes and carbon nanofibers undesirably prevent a binder that is used for binding the active materials and for binding the active materials to a current collector, to penetrate between the carbon nanotubes and carbon nanofibers. Therefore, the adherence of the active material to a current collector substantially deteriorates. In addition, the active materials do not sufficiently interconnect with each other, and thus are present in a form of a mass. Therefore, a rechargeable lithium battery that is constructed with the active materials having carbon nanotubes or carbon nanofibers, does not have an excellent electrically conductive network.

Such a problem is very serious when an aqueous binder such as polyacrylic acid is used, since the active material on which carbon nanotubes or nanofibers is grown has a very strong hydrophobic surface.

SUMMARY OF THE INVENTION

It is an object of the present invention to provide an improved active material for a rechargeable lithium battery.

It is another object of the present invention to provide an active material for a rechargeable lithium battery that has an improved cycle life characteristic and excellent electric conductivity.

It is another object of the present invention to provide an improved rechargeable lithium battery that includes the active material.

The embodiments of the present invention are not limited to the above technical purposes, and a person with ordinary skill in the related art can appreciate other technical purposes.

According to one aspect of the present invention, an active material is provided for a rechargeable lithium battery. The active material includes a non-carbon-based material on which nanofiber-shaped carbon with an oxygen-included functional group is grown.

According to another aspect of the present invention, a rechargeable lithium battery is provided with a negative electrode including a negative active material, a positive electrode including a positive active material, and an electrolyte impregnating the negative electrode and the positive electrode. At least one of the negative and positive active materials includes a non-carbon-based material on which nanofiber-shaped carbon with an oxygen-included functional group is grown.

The oxygen-included functional group is selected from the group consisting of carboxyl (COOH), carbonyl (CO), hydroxyl (OH), phenol, lactone, oxo (O=), carboxyl anhydride, peroxide, and combinations thereof.

The nanofiber-shaped carbon may be either carbon nanofibers or carbon nanotubes.

The nanofiber-shaped carbon has a diameter of approximately 500 nm or less. In one embodiment according to the principles of the present invention, the nanofiber-shaped carbon may have a diameter of 200 nm or less. In another embodiment according to the principles of the present invention, the nanofiber-shaped carbon may have a diameter of approximately 1 nm to 100 nm.

The active material can be used in at least one of the negative and positive electrodes.

When the non-carbon-based material is used in a negative electrode, the non-carbon-based material can be selected from the group consisting of lithium vanadium oxide; Si; silicon oxide ($SiO_x$(0<x<2)); a Si—Y alloy, where Y is an element selected from the group consisting of an alkali metal, an alkaline-earth metal, a group 13 element, a group 14 element, a transition element, a rare earth element, and combinations thereof, and excluding Si; Sn; $SnO_2$; a Sn—Y alloy, where Y is an element selected from the group consisting of an alkali metal, an alkaline-earth metal, a group 13 element, a group 14 element, a transition element, a rare earth element, and combinations thereof, and excluding Sn; and combinations thereof. The element Y can be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Ru, Os, Hs, Rh, Ir, Pd, Pt, Cu, Ag, Au, Zn, Cd, B, Al, Ga, In, Ti, Ge, P, As, Sb, Bi, S, Se, Te, Po, and combinations thereof.

When the active material is used for a positive electrode, the non-carbon-based material can be a compound represented by any one the following Formulae 1 to 14:

$$Li_{(3-f)}Fe_2PO_{43} \ (0=f=2); \quad (1)$$

$$LiFePO_4; \quad (2)$$

$$Li_aA_{1-b}B_bD_2; \quad (3)$$

wherein $0.95=a=1.1$ and $0=b=0.5$;

$$Li_aMn_{1-b}B_bO_{2-c}F_c \quad (4)$$

wherein $0.95=a=1.1$, $0=b=0.5$, and $0=c=0.05$;

$$LiMn_{2-b}B_bO_{4-c}F_c \quad (5)$$

wherein $0=b=0.5$ and $0=c=0.05$;

$$Li_aNi_{1-b-c}Mn_bB_cD_a \quad (6)$$

wherein $0.95=a=1.1$, $0=b=0.5$, $0=c=0.05$, and $0<a=2$;

$$Li_aNi_{1-b-c}Mn_bB_cO_{2-a}F_a \quad (7)$$

wherein $0.95=a=1.1$, $0=b=0.5$, $0=c=0.05$, and $0<a<2$;

$$Li_aNi_{1-b-c}Mn_bB_cO_{2-a}F_2 \quad (8)$$

wherein $0.95=a=1.1$, $0=b=0.5$, $0=c=0.05$, and $0<a<2$;

$$Li_aNi_bE_cG_dO_2 \quad (9)$$

wherein $0.90=a=1.1$, $0=b=0.9$, $0=c=0.5$, and $0.001=d=0.1$;

$$Li_aNiG_bO_2 \quad (10)$$

wherein $0.90=a=1.1$ and $0.001=b=0.1$;

$$Li_aMnG_bO_2 \quad (11)$$

wherein $0.90=a=1.1$ and $0.001=b=0.1$;

$$Li_aMn_2G_bO_4 \quad (12)$$

wherein $0.90=a=1.1$ and $0.001=b=0.1$;

$$LiNiVO_4; \text{ and} \quad (13)$$

$$Li_{(3-f)}J_2PO_{43}(0=f=2). \quad (14)$$

In the above formulae, A is selected from the group consisting of Ni, Mn, and combinations thereof;

B is selected from the group consisting of Al, Ni, Mn, Cr, Fe, Mg, Sr, V, a rare earth element, and combinations thereof;

D is selected from the group consisting of O, F, S, P, and combinations thereof;

F is selected from the group consisting of F, S, P, and combinations thereof;

G is selected from the group consisting of Al, Cr, Mn, Fe, Mg, La, Ce, Sr, V, and combinations thereof;

Q is selected from the group consisting of Ti, Mo, Mn, and combinations thereof;

I is selected from the group consisting of Cr, V, Fe, Sc, Y, and combinations thereof; and J is selected from the group consisting of Mn, Ni, Cu, and combinations thereof.

The negative active material for a rechargeable lithium battery has excellent conductivity and cycle life characteristics.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIGS. 1A and 1B schematically illustrate a negative active material in a slurry and on an electrode, respectively, as an embodiment of the principles of the present invention;

FIGS. 2A and 2B schematically illustrate a contemporary negative active material in a slurry and on an electrode, respectively;

DETAILED DESCRIPTION OF THE INVENTION

Figure 3:
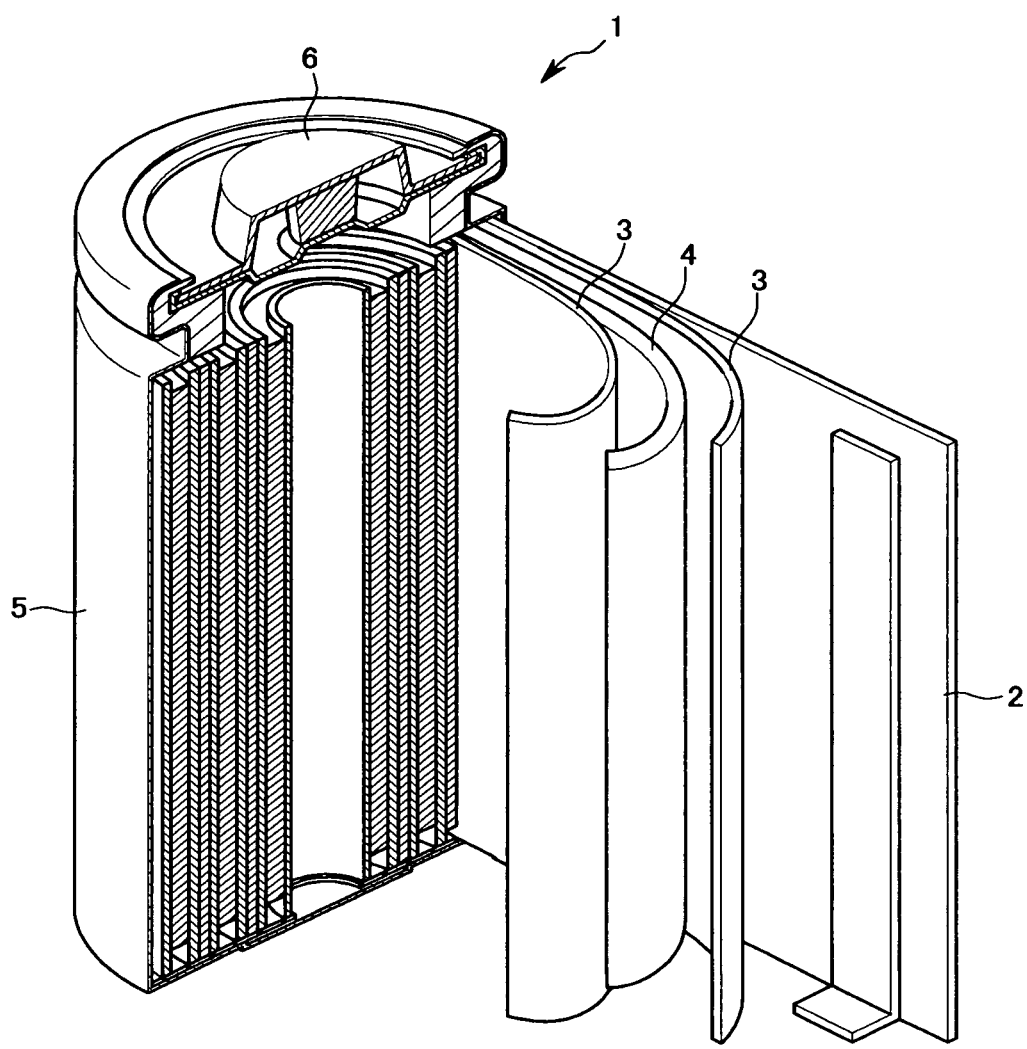
FIG. 3 schematically illustrates the structure of a rechargeable lithium battery constructed as an embodiment according to the principles of the present invention.

The present invention will hereinafter be described in detail.

The present invention relates to an active material for a rechargeable lithium battery and particularly, to a non-carbon-based negative active material with improved conductivity. The present invention proposes growing nanofiber-shaped carbon such as carbon nanotubes or carbon nanofibers, and then oxidizing the nanofiber-shaped carbon. In addition, when the nanofiber-shaped carbon is applied to a positive active material, the nanofiber-shaped carbon may also improve the conductivity of the positive active material.

In other words, an active material according to the embodiment of the present invention includes a non-carbon-based material on which nanofiber-shaped carbon with an oxygen-included functional group has grown.

If the nanofiber-shaped carbon with an oxygen-included functional group is included as an additive (i.e., as a binder) in a negative active material composition or a positive active material composition, the nanofiber-shaped carbon with an oxygen-included functional group may have very weak adherence.

The oxygen-included functional group is selected from the group consisting of carboxyl (COOH), carbonyl (CO), hydroxyl (OH), phenol, lactone, oxo (O═), carboxyl anhydride, peroxide, and combinations thereof.

The nanofiber-shaped carbon may have a diameter of less than approximately 500 nm or less than approximately 200 nm. In another embodiment, it may have a diameter ranging from approximately 1 nm to approximately 100 nm. In other words, the nanofiber-shaped carbon may have a diameter of approximately 500 nm, approximately 400 nm, approximately 300 nm, approximately 200 nm, approximately 150 nm, approximately 100 nm, approximately 80 nm, approximately 50 nm, approximately 20 nm, approximately 10 nm, approximately 5 nm, or approximately 1 nm. In the present invention, nanofiber-shaped carbon refers to carbon nanotubes and carbon nanofibers. In general, carbon nanotubes are distinguished from carbon nanofibers depending on their diameters. The carbon nanofibers have a diameter of more than 100 nm, while the carbon nanotubes have a diameter of less than 100 nm. When the nanofiber-shaped carbon has a diameter of more than 500 nm, the amount of the nanofiber-shaped carbon and the surface area are substantially and extremely low because it is hollow inside. As a result, the nanofiber-shaped carbon may have less effect than a nanofiber-shaped carbon with a diameter of more than 500 nm even when the nanofiber-shaped carbon is used in the same amount. In addition, it is difficult to fabricate a nanofiber-shaped carbon with a diameter of less than 1 nm, so the minimum diameter of the usable nanofiber-shaped carbon is approximately 1 nm.

The active material according to the principles of the present invention may include the nanofiber-shaped carbon in an amount of 1 to 20 parts by weight based on 100 parts by weight of the non-carbon-based material. The active material may use nanofiber-shaped carbon in an amount of approximately 0.1 parts to 20 parts by weight based on 100 parts by weight of the non-carbon-based material. In one embodiment according to the principles of the present invention, the active material may be included in an amount of approximately 1 part to 10 parts by weight. In another embodiment according to the principles of the present invention, the active material may be, included in an amount of approximately 1 part to 7 parts by weight. When the nanofiber-shaped carbon is included in an amount of more than 20 parts by weight based on 100 parts by weight of the non-carbon-based material, the capacity of the active material may be relatively deteriorated. When the nanofiber-shaped carbon is included in an amount of less than 1 part by weight, the nanofiber-shaped carbon may not have any effects.

The active material according to the principles of the present invention can be used for at least one of negative and positive electrodes. When the active material is used for a negative electrode, the non-carbon-based material can be selected from the group consisting of lithium vanadium oxide; Si; silicon oxide ($SiO_x$ (0<x<2)); a Si—Y alloy where Y is an element selected from the group consisting of an alkali metal, an alkaline-earth metal, a group 13 element, a group 14 element, a transition element, a rare earth element, and combinations thereof, and excluding Si; Sn; $SnO_2$; a Sn—Y alloy where Y is an element selected from the group consisting of an alkali metal, an alkaline-earth metal, a group 13 element, a group 14 element, a transition element, a rare earth element, and combinations thereof, and excluding Sn; and combinations thereof. The element Y is selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Ru, Os, Hs, Rh, Ir, Pd, Pt, Cu, Ag, Au, Zn, Cd, B, Al, Ga, In, Ti, Ge, P, As, Sb, Bi, S, Se, Te, Po, and combinations thereof.

When the active material is used for a positive electrode, the non-carbon-based material can be a compound represented by any one of the following Formulae 1 to 14:

$$Li_{(3-f)}Fe_2PO_{43} (0 \leq f \leq 2); \quad (1)$$

$$LiFePO_4; \quad (2)$$

$$Li_a A_{1-b} B_b D_2; \quad (3)$$

wherein $0.95 \leq a \leq 1.1$ and $0 \leq b \leq 0.5$;

$$Li_a Mn_{1-b} B_b O_{2-c} F_c \quad (4)$$

wherein $0.95 \leq a \leq 1.1$, $0 \leq b \leq 0.5$, and $0 \leq c \leq 0.05$;

$$LiMn_{2-b} B_b O_{4-c} F_c \quad (5)$$

wherein $0 \leq b \leq 0.5$ and $0 \leq c \leq 0.05$;

$$Li_a Ni_{1-b-c} Mn_b B_c D_a \quad (6)$$

wherein $0.95 \leq a \leq 1.1$, $0 \leq b \leq 0.5$, $0 \leq c \leq 0.05$, and $0 < a \leq 2$;

$$Li_a Ni_{1-b-c} Mn_b B_c O_{2-a} F_a \quad (7)$$

wherein $0.95 \leq a \leq 1.1$, $0 \leq b \leq 0.5$, $0 \leq c \leq 0.05$, and $0 < a < 2$;

$$Li_a Ni_{1-b-c} Mn_b B_c O_{2-a} F_2 \quad (8)$$

wherein $0.95 \leq a \leq 1.1$, $0 \leq b \leq 0.5$, $0 \leq c \leq 0.05$, and $0 < a < 2$;

$$Li_a Ni_b E_c G_d O_2 \quad (9)$$

wherein $0.90 \leq a \leq 1.1$, $0 \leq b \leq 0.9$, $0 \leq c \leq 0.5$, and $0.001 \leq d \leq 0.1$;

$$Li_a NiG_b O_2 \quad (10)$$

wherein $0.90 \leq a \leq 1.1$ and $0.001 \leq b \leq 0.1$;

$$Li_a MnG_b O_2 \quad (11)$$

wherein $0.90 \leq a \leq 1.1$ and $0.001 \leq b \leq 0.1$;

$$Li_a Mn_2 G_b O_4 \quad (12)$$

wherein $0.90 \leq a \leq 1.1$ and $0.001 \leq b \leq 0.1$;

$$LiNiVO_4; \text{ and} \quad (13)$$

$$Li_{(3-f)} J_2 PO_{43} (0 \leq f \leq 2). \quad (14)$$

In the above formulae, A is selected from the group consisting of Ni, Mn, and combinations thereof;

B is selected from the group consisting of Al, Ni, Mn, Cr, Fe, Mg, Sr, V, a rare earth element, and combinations thereof;

D is selected from the group consisting of O, F, S, P, and combinations thereof;

F is selected from the group consisting of F, S, P, and combinations thereof;

G is selected from the group consisting of Al, Cr, Mn, Fe, Mg, La, Ce, Sr, V, and combinations thereof;

Q is selected from the group consisting of Ti, Mo, Mn, and combinations thereof;

I is selected from the group consisting of Cr, V, Fe, Sc, Y, and combinations thereof; and J is selected from the group consisting of Mn, Ni, Cu, and combinations thereof.

The active material may further include a polymer layer between the non-carbon-based material surface and the oxidized nanofiber-shaped carbon. The polymer layer includes a cationic polymer, and the example of the cationic polymer may be a cationic polymer having —$NH_2$, —$NR_3$, wherein R is a C1 to C4 lower alkyl, or $CONH_2$. Examples of the cationic polymer includes polyethyleneimine (branched or linear of the following Formulae 15 or 16, a poly(amidoamine) dendrimer of the following Formula 17, poly(L-lysine) of the following Formula 18, poly(N-ethyl-4-vinylpyridinium) bromide of the following Formula 19, poly(dimethylaminoethyl)methylacrylate of the following Formula 20, and orchitosan of the following Formula 21:

(15)

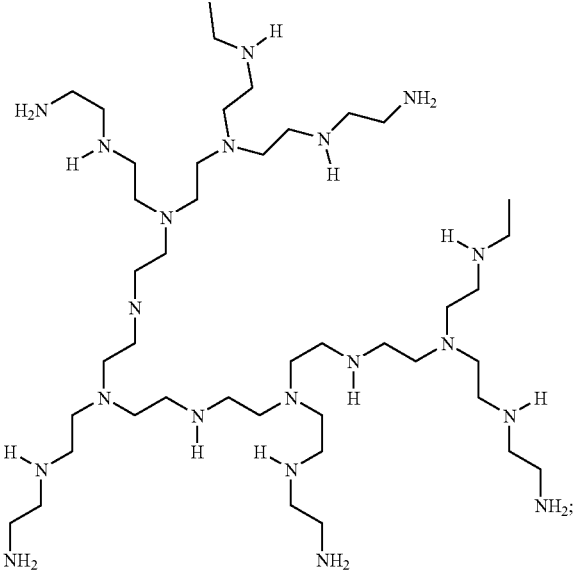

(16)

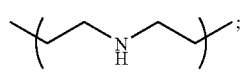

(17)

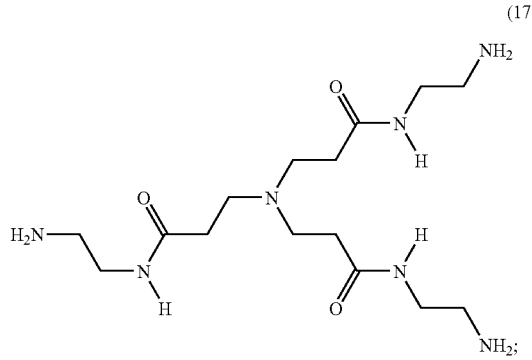

(18)

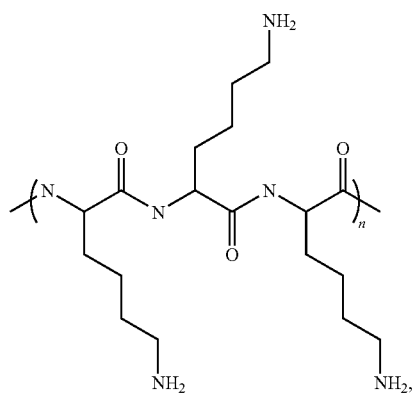

wherein n ranges from 1 to 100,000;

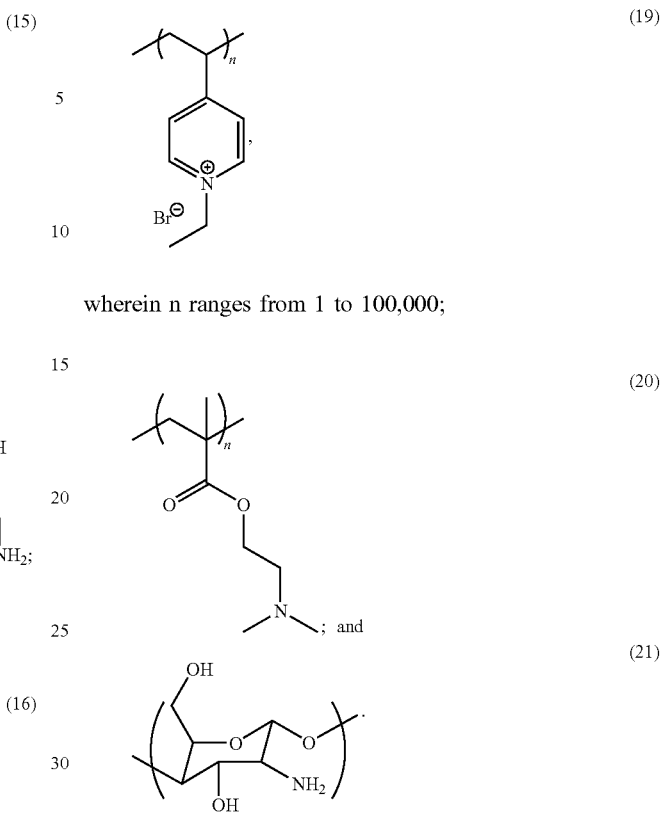

wherein n ranges from 1 to 100,000;

The polymer layer may include a cationic surfactant such as polyoxyethyleneamine, cetylpyridinium bromide, a fatty amine acetate, oleyl imidazolium methosulfate, and methyl triethanolammonium methylsulfate dialkylester, and the polymer layer may include the cationic polymer along with the cationic surfactant.

FIGS. 1A and 1B schematically illustrate a negative active material in a slurry and on an electrode, respectively, as an embodiment of the principles of the present invention.

In FIG. 1A, oxidized carbon nanotubes 120 are grown on the surface of active material 110. When a liquid composition including active material 110 with oxidized nanotubes 120 grown on the surface thereof is coated on an electrode and then dried, oxidized carbon nanotube particles 120 contact each other. When an active material has a surface that is applied with a functional group of negatively charged carbon nanotubes in the liquid composition, the nanotubes may not become tangled due to an electrically repulsive force, but are dispersed as individual carbon nanotubes as shown in FIG. 1A. In this way, the active material can be free from a problem in which nanotubes grown on the surface of the active material have a very large specific surface area by being easily tangled due to the Van der Waals interaction.

As shown in FIG. 1A, when the carbon nanotubes are dispersed in an active material and prepared into a liquid composition, the carbon nanotubes can improve a dispersibility of the active material. In addition, when the nanotubes uniformly contact each other, the nanotubes may increase the number of passages for delivering electrons to the surface of the active material in an electrode. Furthermore, since the nanotubes are a uniform composite and thereby increase strength of the substrate, the nanotubes may not easily be detached from the substrate.

On the other hand, when a negative active material with non-oxidized carbon nanotubes grown on the surface is prepared to form a negative active material composition as in FIG. 2A, and the negative active material composition is coated on a negative electrode as in FIG. 2B, neutral carbon nanotubes on the surface are severely entangled due to Van der Waals interaction and thereby may not be uniformly dispersed. This problem can be worse due to the hydrophobic property of a carbon material particularly when an aqueous binder is included, since the carbon material and the aqueous binder are mixed together. In addition, when the carbon material is prepared into a substrate, the carbon material may have a decreased density when forming a network.

According to another embodiment of the present invention, an active material can be prepared as follows.

The nanofiber-shaped carbon is grown on a non-carbon-based material. Herein, the nanofiber-shaped carbon can be grown in any general method.

For example, carbon nanotubes are grown by supporting a compound including a catalyst element on the surface of a non-carbon-based material, heating the non-carbon-based material under an inert gas atmosphere at a temperature ranging from approximately 100° C. to approximately 1000° C., and reducing the catalyst through inflow of a carbon gas such as methane, ethane, ethylene, butane, carbon monoxide, and the like.

The catalyst element may include transition elements such as Fe, Ni, Co, Ca, Y, Mg, and the like. The compound including the catalyst element may include $CaCO_3$, $CoNO_3 \cdot 6H_2O$, $Fe\ NO_3 \cdot 6H_2O$, $Ni\ NO_3 \cdot 6H_2O$, $YNO_3 \cdot 6H_2O$, $Mg\ NO_3 \cdot 6H_2O$, and the like. The inert gas may include argon gas, nitrogen gas, or the like. Herein, the inert gas may be prepared by being mixed with hydrogen gas in an appropriate ratio.

Then, the non-carbon-based material with nanofiber-shaped carbon grown on the surface thereof is oxidized to prepare a negative active material including an oxygen-included functional group in the nanofiber-shaped carbon.

The oxidation process may include a step of heat treatment or a step of agitation by dipping the non-carbon-based material with nanofiber-shaped carbon grown thereon in an oxidation solution.

The heat treatment can be performed in an air atmosphere.

When the heat treatment is performed in an inert atmosphere, the nanofiber-shaped carbon is not oxidized but is combusted and little may be left on the surface of a non-carbon-based material.

The heat treatment may be performed at a temperature of approximately 500° C. or less. In another embodiment according to the principles of the present invention, the heat treatment may be performed at a temperature ranging from approximately 200° C. to approximately 500° C. When the heat treatment is performed at a temperature of more than 500° C., nanofiber-shaped carbon may be combusted and not left on the surface of a non-carbon-based material.

The oxidation solution for dipping the non-carbon-based material with nanofiber-shaped carbon grown on the surface thereof may be selected from the group consisting of hydrogen peroxide ($H_2O_2$), $(NH_4)_2S_2O_8$, perchloric acid ($HClO_4$), and combinations thereof. In addition, the oxidation solution may have a concentration ranging from approximately 1 wt % to 100 wt %. In particular, the oxidation solution may have a concentration ranging from approximately 20 wt % to 50 wt %.

The dipping step may be performed within a certain time period as long as the desired oxidization effects can be obtained and adverse effects do not affect the non-carbon-based material with nanofiber-shaped carbon grown on the surface thereof. For example, the dipping step may be performed for a time ranging from approximately 1 hour to approximately 100 hours.

When the oxidation process is complete, an active material is prepared through filtration and drying.

According to another embodiment of the principles of the present invention, an active material is prepared by adding a non-carbon-based material to a polymer solution to prepare a mixture, drying the mixture, then adding the dried mixture and nanofiber-shaped carbons to a solvent, evaporating the solvent to obtain a product, and heat-treating the product.

Herein, the polymer solution may include a cationic polymer. The cationic polymer may include a polymer such as $NH_2$, $-NR_3$, or $CONH_2$.

In addition, the polymer solution may have a concentration ranging from approximately 1 wt % to approximately 10 wt % and include water or the like as a solvent. The drying process is performed at a certain degree for removing the solvent and can be appropriately regulated depending on the kinds of solvent.

The obtained product is a non-carbon-based material coated with a polymer. The subsequent heat-treatment may remove unnecessary polymers. The condition for the heat treatment can be appropriately regulated depending on the kinds of non-carbon-based materials. For example, the heat treatment may be performed at a temperature of approximately 500° C. or less in an air atmosphere. In another embodiment according to the principles of the present invention, the heat treatment may be performed at a temperature ranging from approximately 200° C. to approximately 500° C. under an air atmosphere.

The electrode including the active material includes a binder.

The binder acts to bind negative active material particles with each other and also to bind negative active material particles with the current collector. Examples of the binder include at least one selected from the group consisting of polyvinyl alcohol, polyimide, polyacrylic acid, carboxylmethylcellulose, hydroxypropylenecellulose, diacetylenecellulose, polyvinylchloride, carboxylated polyvinylchloride, polyvinyldifluoride, an ethylene oxide-containing polymer, polyvinylpyrrolidone, polyurethane, polytetrafluoroethylene, polyvinylidene fluoride, polyethylene, polypropylene, styrene-butadiene rubber, an acrylated styrene-butadiene rubber, an epoxy resin, nylon, and so on, but is not limited thereto. When the binder is polyacrylic acid, carboxylmethylcellulose, polyvinylalcohol, or a styrene-butadiene rubber, conductivity and cycle life characteristics of the electrode provided with the binder can be more improved than the electrode provided with other binders.

Since the active material has good conductivity, a conductive material is not needed. In order to improve conductivity of the electrode, however, a general conductive material can be added.

The general conductive material can be any conductive material used for a general rechargeable lithium battery. Examples of the conductive material include natural graphite, artificial graphite, carbon black, acetylene black, ketjen black, carbon fiber, a metal powder or a metal fiber including copper, nickel, aluminum, silver, and so on, or a polyphenylene derivative.

The electrode includes a current collector supporting an active material layer including the active material, binder, and optionally a conductive material.

When the active material is used for a negative electrode, the current collector may be selected from the group consisting of a copper foil, a nickel foil, a stainless steel foil, a titanium foil, a nickel foam, a copper foam, and a polymer material coated with a conductive metal. When the active material is used for a positive electrode, the current collector may be Al.

The electrode may be fabricated in accordance with a general electrode manufacturing process. For example, the active material, the binder, an optional conductive material, and a solvent are mixed to prepare an active material composition, and then the active material composition is applied on a current collector. The solvent may include N-methylpyrrolidone, but the solvent is not limited thereto.

After the active material composition is applied on a current collector, heat treatment may be performed. The heat treatment may be performed at approximately 50° C. to 200° C. to increase adherence. The heat treatment may be performed under a vacuum atmosphere. When the heat treatment is further performed, a chemical bond between the active material and the binder may be formed, resulting in an improvement of the adherence between the active material layer and the current collector.

According to a second embodiment of the principles of the present invention, a rechargeable lithium battery is constructed with the negative electrode and the positive electrode, and an electrolyte.

The electrolyte includes a lithium salt dissolved in a non-aqueous organic solvent. The non-aqueous organic solvent acts as a medium for transmitting ions taking part in the electrochemical reaction of the battery.

The non-aqueous organic solvent may include a carbonate-based, ester-based, ether-based, ketone-based, alcohol-based, or aprotic solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and so on. Examples of the ester-based solvent may include n-methyl acetate, n-ethyl acetate, n-propyl acetate, dimethylacetate, methylpropionate, ethylpropionate, γ-butyrolactone, decanolide, valerolactone, mevalonolactone, caprolactone, and so on. Examples of the ether-based solvent include dibutyl ether, tetraglyme, diglyme, dimethoxyethane, 2-methyltetrahydrofuran, tetrahydrofuran, and so on, and examples of the ketone-based solvent include cyclohexanone and so on. Examples of the alcohol-based solvent include ethyl alcohol, isopropyl alcohol, and so on. Examples of the aprotic solvent include nitriles such as R—CN (wherein R is a C2 to C20 linear, branched, or cyclic hydrocarbon, a double bond, an aromatic ring, or an ether bond), amides such as dimethylformamide, dioxolanes such as 1,3-dioxolane, sulfolanes, and so on.

The non-aqueous organic solvent may be used either alone or in a mixture. When the organic solvent is used in a mixture, a mixture ratio can be controlled in accordance with a desirable battery performance.

The carbonate-based solvent may include a mixture of a cyclic carbonate and a linear carbonate. The cyclic carbonate and the chain carbonate are mixed together in a volume ratio of approximately 1:1 to 1:9, and when the mixture is used as an electrolyte, the electrolyte performance may be enhanced.

In addition, the electrolyte of the present invention may further include mixtures of carbonate-based solvents and aromatic hydrocarbon-based solvents. The carbonate-based solvents and the aromatic hydrocarbon-based solvents are preferably mixed together in a volume ratio of approximately 1:1 to approximately 30:1.

The aromatic hydrocarbon-based organic solvent may be represented by the following Formula 22:

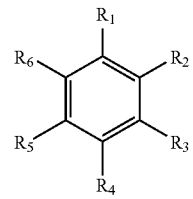

(22)

wherein $R_1$ to $R_6$ are independently selected from the group consisting of hydrogen, a halogen, a C1 to C10 alkyl, a C1 to C10 haloalkyl, and combinations thereof.

The aromatic hydrocarbon-based organic solvent may include, but is not limited to, at least one selected from the group consisting of benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, and combinations thereof.

In order to improve the cycle life characteristics of the battery, the non-aqueous electrolyte may further include additives such as vinylene carbonate or an ethylene carbonate-based compound of the following Formula 23:

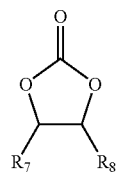

(23)

wherein $R_7$ and $R_8$ are independently selected from the group consisting of hydrogen, a halogen, a cyano (CN), a nitro ($NO_2$), and a C1 to C5 fluoroalkyl, and at least one of the $R_7$ and $R_8$ are selected from the group consisting of a halogen, a cyano (CN), a nitro ($NO_2$), and a C1 to C5 fluoroalkyl, provided that $R_7$ and $R_8$ are not simultaneously hydrogen.

The ethylene carbonate-based compound includes difluoroethylene carbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the additive that is used for improving cycle-life may be adjusted within an appropriate range.

The lithium salt supplies lithium ions in the battery, and facilitates a basic operation of a rechargeable lithium battery and improves lithium ion transport between positive and negative electrodes. Non-limiting examples of the lithium salt include at least one selected from the group consisting of LiPF$_6$, LiBF$_4$, LiSbF$_6$, LiAsF$_6$, LiCF$_3$SO$_3$, LiN(SO$_2$C$_2$F$_5$)$_2$, Li(CF$_3$SO$_2$)$_2$N, LiC$_4$F$_9$SO$_3$, LiClO$_4$, LiAlO$_4$, LiAlCl$_4$, LiN(C$_x$F$_{2x+1}$SO$_2$)(C$_y$F$_{2y+1}$SO$_2$) (where x and y are natural numbers), LiCl, LiI, and LiB(C$_2$O$_4$)$_2$ (lithium bis (oxalato) borate: LiBOB). The lithium salt may be used at a concentration of approximately 0.1 M to 2.0 M. When the lithium salt concentration is less than approximately 0.1 M, electrolyte performance may be deteriorated due to low electrolyte conductivity, whereas when the lithium salt concentration is more than approximately 2.0 M, lithium ion mobility may be reduced due to an increase of electrolyte viscosity.

The rechargeable lithium battery may further include a separator between a positive electrode and a negative electrode, as needed. Non-limiting examples of suitable separator materials include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

FIG. 3 schematically illustrates a structure of a rechargeable lithium battery according to the second embodiment of the principles of the present invention. As shown in FIG. 3, a rechargeable lithium battery 1 is constructed with a positive electrode 4, a negative electrode 2, a separator 3 interposed between positive electrode 4 and negative electrode 2, an electrolyte (not shown) impregnating positive electrode 4, negative electrode 2, and separator 3, a battery case 5, and a sealing member 6 sealing battery case 5.

The following examples illustrate the present invention in more detail. These examples, however, should not in any sense be interpreted as limiting the scope of the present invention.

Example 1

Silicon oxide, SiO$_x$ (x=1.48), was added as a core material to an aqueous solution including iron nitrate, magnesium nitrate, and ammonium molybdate. The mixture was dried and then heat-treated to coat a catalyst on the surface of silicon oxide.

The silicon oxide coated with the catalyst was put in a chemical vapor deposition (CVD) chamber in which a mixed gas including hydrogen gas (H$_2$) and argon gas (Ar) was made to flow for five minutes, and then ethylene (C$_2$H$_4$) gas was made to flow in a certain amount at approximately 900° C. to mainly grow multi-walled carbon nanotubes on the surface of the silicon oxide core material. Herein, carbon nanofibers, i.e., the multi-walled carbon nanotubes, grew in a very little quantity.

The grown carbon nanotubes were present at 1 wt % based on the weight of the silicon oxide core material.

The SiO$_x$ (x=1.48) with carbon nanotubes grown on the surface thereof was added to hydrogen peroxide water at approximately 50 wt %. The mixture was agitated for about 5 hours, then filtered and dried at approximately 120° C. to prepare a negative active material. The negative active material had a diameter of 15 μm and included SiO$_x$ (x=1.48) with carbon nanotubes grown on the surface thereof. The carbon nanotubes included a carboxyl group, a hydroxyl group, a lactone group, and the like.

The carbon nanotubes had a diameter ranging from approximately 1 nm to 100 nm.

Then, 95 wt % of the negative active material was mixed with 5 wt % of a polyacrylic acid binder in an N-methylpyrrolidone solvent to prepare a negative active material composition. The negative active material composition was coated on a copper current collector to prepare a negative electrode.

Example 2

A negative electrode was prepared according to the same method as in Example 1, except for additionally performing vacuum-heat treatment at approximately 200° C. after coating the negative active material composition on the copper current collector.

Example 3

A negative electrode was prepared according to the same method as in Example 1, except for using a polyimide binder instead of a polyacrylamide binder.

Example 4

A negative electrode was prepared according to the same method as in Example 1, except for using a Li$_{1.08}$Mo$_{0.02}$V$_{0.9}$O$_2$ lithium vanadium oxide instead of SiO$_x$ (x=1.48).

Example 5

A negative electrode was prepared according to the same method as in Example 1, except for using a Si—Y alloy (herein, Y is Ni) instead of SiO$_x$ (x=1.48).

Example 6

A negative electrode was prepared according to the same method as in Example 1, except for preparing a positive active material by using LiCoO$_2$ instead of SiO$_x$ (x=1.48).

Example 7

LiFePO$_4$ was put in a ceramic reaction container, in which a mixed gas including hydrogen gas (H$_2$) and argon gas (Ar) was made to flow for 5 minutes at approximately 500° C. to mainly grow carbon nanotubes on the surface of LiFePO$_4$ by using ethylene (C$_2$H$_4$) gas. The carbon nanotubes had a diameter ranging from approximately 5 nm to 200 nm on the surface of LiFePO$_4$. In addition, carbon nanofibers also grew in a very small amount in the same process.

The LiFePO$_4$ with carbon nanotubes grown on the surface thereof was added to 50 wt % hydrogen peroxide water. The mixture was agitated for about 5 hours and then filtered and dried at 120° C. to prepare a positive active material.

Then, 95 wt % of the positive active material was mixed with 5 wt % of a polyvinylidene fluoride binder in an N-methylpyrrolidone solvent to prepare a positive active material slurry. The slurry was coated on an aluminum current collector to prepare a positive electrode.

Example 8

SiO$_x$ (x=1.48) was added to a polyethyleneimine aqueous solution in a 1 wt % concentration and sufficiently agitated together, and then filtrated. The filtrate was dried at 120° C. to obtain a powder.

The obtained powder was added to an aqueous solution including carbon nanotubes with a carboxyl group, a hydroxyl group, and a lactone group. Herein, the aqueous solution included 0.5 wt % of carbon nanotubes including a carboxyl group, a hydroxyl group, and a lactone group based on the weight of $SiO_x$ (x=1.48).

The mixture was agitated for 5 hours. Then, the water in the mixture was forcibly evaporated to prepare a powder. The powder was heat-treated at 120° C. to prepare a negative active material.

The negative active material was used to prepare a negative electrode according to the same method as in Example 1.

Comparative Example 1

A negative electrode was prepared according to the same method as in Example 1 except for using SiOx (x=1.48) with carbon nanotubes grown on the surface thereof as a negative active material. In other words, the addition of SiOx (x=1.48) with carbon nanotubes grown on the surface thereof to the hydrogen peroxide water was not performed.

Comparative Example 2

A negative electrode was prepared according to the same method as in Example 3, except for using SiOx (x=1.48) with carbon nanotubes grown on the surface thereof as a negative active material. In other words, the addition of $SiO_x$ (x=1.48) with carbon nanotubes grown on the surface thereof to the hydrogen peroxide water was not performed.

Comparative Example 3

A negative electrode was prepared according to the same method as in Example 1, except for preparing negative active material slurry by mixing 92 wt % of a $SiO_x$ (x=1.48) negative active material with 5 wt % of a polyimide binder and 3 wt % of a carbon black conductive material in N-methylpyrrolidone.

Comparative Example 4

A positive electrode was prepared by mixing 3 wt % of a $LiFePO_4$ positive active material, 3 wt % of an acetylene black conductive material, and 5 wt % of a polyvinylidene fluoride binder in an N-methylpyrrolidone solvent to prepare a positive active material slurry, and then coating the slurry on an aluminum current collector.

Figure 4:
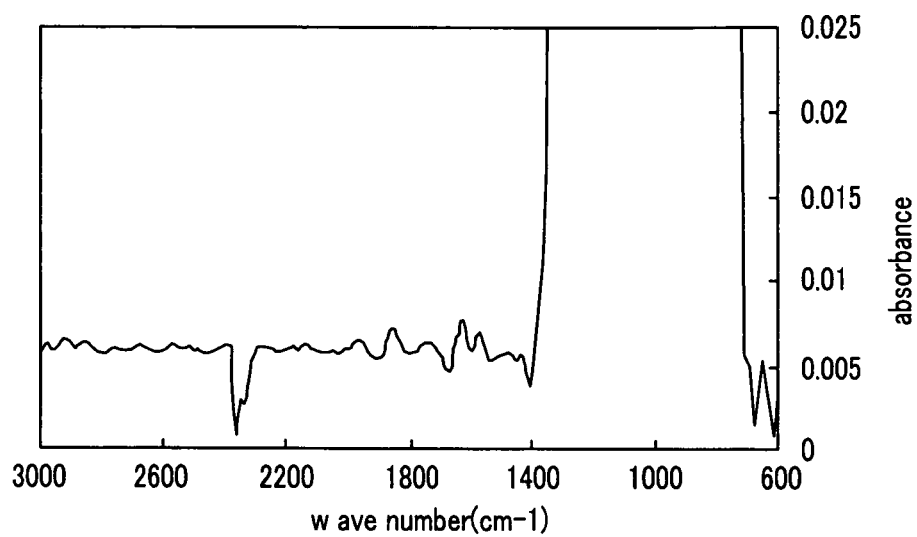
FIG. 4 is a graph showing Fourier Transform-Infrared (FT-IR) measurement results of a negative active material constructed according to Example 1 as an embodiment of the principles of the present invention.

Then, the negative active material according to Example 1 was measured using Fourier Transform and Infrared (FT-IR) spectroscopy. The results are shown in FIG. 4. In FIG. 4, a large peak of 1000 $cm^{-1}$ indicates Si oxide, a peak of 1700 $cm^{-1}$ indicates a C=O bond, and a peak of 1560 $cm^{-1}$ indicates a C=C bond. Referring to the results of FIG. 4, the negative active material according to Example 1 was bonded to a carboxyl group, a hydroxyl group, a lactone group, and the likeyde group on the surface.

The rechargeable lithium batteries according to Examples 1 to 8 and Comparative Examples 1 to 4 were measured regarding cycle life and discharge recovery rate. The results are shown in the following Table 1. The discharge recovery rate can be used as an index for determining conductive network possibility inside an electrode. In general, the discharge recovery rate can be acquired by calculating how much capacity can be recovered when a battery is discharged at a low rate, since the battery having decreased capacity as the charge-discharge cycles are repeated.

On the other hand, the cycle life characteristic was estimated by the following process. A battery was charged and discharged at 0.2 C once, and a first discharge capacity was measured. Then, the battery was charged and discharged at 1 C for one hundred (100) times, and a second discharge capacity was measured. The cycle life characteristic was estimated by the ratio of the second discharge capacity versus the first discharge capacity. In addition, the discharge recovery rate was estimated by the following procedure. First, a battery was charged and discharged at 0.2 C once, and a first recovered capacity was measured. The, the battery was charged and discharged at 1 C for 100 times, then charged and discharged at 0.2 C once, and a second recovered capacity was measured. The discharge recovery rate was calculated by the ratio of the first recovered capacity versus the second recovered capacity. Note that the charge and discharge current of a battery is measured in C-rate. The batteries are rated at 1 C. A discharge rate of 1 C draws a current equal to the rated capacity. For example, a battery rated at 1000 mAh provides 1000 mA for one hour if discharged at 1 C rate. The same battery discharged at 0.5 C provides 500 mA for two hours. At 2 C, the same battery delivers 200 mA for 30 minutes. 1 C is often referred to as a one-hour discharge; a 0.5 C would be a two-hour, and a 0.1 C a 10 hour discharge.

TABLE 1

| | $100^{th}$ discharge capacity/ $1^{st}$ discharge capacity (1 C cycle-life (%)) | $1^{st}$ discharge capacity at 0.2 C/ discharge capacity at 0.2 C (recovery rate (%)) |
|---|---|---|
| Example 1 | 64 | 94 |
| Example 2 | 62 | 94 |
| Example 3 | 72 | 92 |
| Example 4 | 78 | 93 |
| Example 5 | 75 | 94 |
| Example 6 | 69 | 90 |
| Example 7 | 80 | 89 |
| Example 8 | 62 | 92 |
| Comparative Example 1 | 54 | 86 |
| Comparative Example 2 | 48 | 79 |
| Comparative Example 3 | 38 | 55 |
| Comparative Example 4 | 62 | 79 |

As shown in Table 1, the rechargeable lithium batteries of Examples 1 to 8 have a much better cycle-life characteristic than those of Comparative Examples 1 to 4.

In addition, comparing the discharge recovery rate at a low rate of the rechargeable lithium battery of Example 1 with the discharge rate of Comparative Example 1 after the cycle-life characteristic determination, the battery of Example 1 had higher discharge recovery rate than that of Comparative Example 1. In other words, the negative electrode of Example 1 maintained relatively higher electronic movement than that of Comparative Example 1.

The reason that the rechargeable lithium battery of Comparative Example 2 had a low discharge recovery rate is as follows. In the rechargeable lithium battery of Comparative Example 2, a negative active material composition with hydrophobic carbon nanotubes grown on the surface thereof was not uniformly dispersed due to an aqueous binder, resulting in non-uniform performance of a substrate. The rechargeable lithium battery of Example 2, however, could include a uniform substrate in which an active material was uniformly dispersed inside a negative active material composition, securing uniform performance.

Examples 6 and 7 relate to experiments of a positive active material, and they had higher cycle life characteristics and discharge recovery rates than Comparative Example 4. The positive active material was found to have higher cycle-life efficiency and recovery rate because the active material particles with oxidized carbon nanotubes grown on the surface thereof formed a more complicated network with one another to prevent detachment of the active material through contraction/expansion of a substrate during the charge and discharge.

Figure 5:
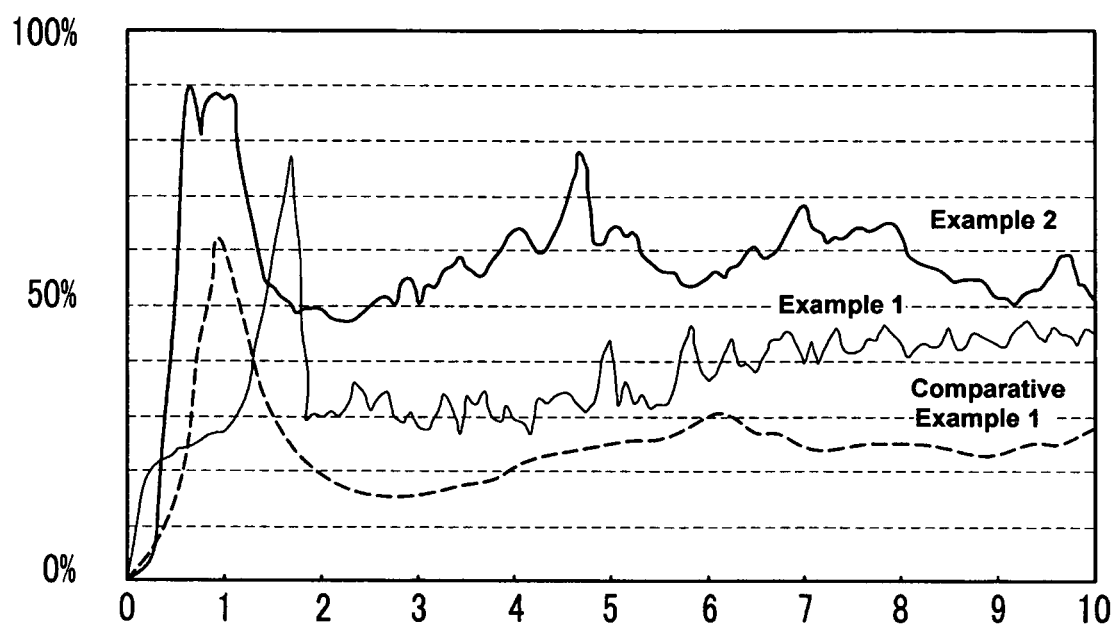
FIG. 5 is a graph showing adherence measurements of negative active materials constructed according to Examples 1 to 2 as embodiments of the principles of the present invention, and according to Comparative Example 1 in a current collector.

FIG. 5 shows adherence of the negative active materials according to Examples 1 to 2 and Comparative Example 1 to a current collector. The adherence experiment was performed as follows. The negative active material compositions of Examples 1 and 2 and Comparative Example 1 were respectively coated on one side of an Al current collector. The coated current collectors were cut into rectangles with a size of 1 cm×8 cm. A 3 cm strip of the each coated current collector was attached to a glass slide on which a double-sided adhesive tape was attached, with the coated side of the coated current collector contacting the double-sided adhesive tape. Then, each coated current collector was pulled from the glass slide.

Referring to FIG. 5, the x axis indicates length from a current collector (unit: mm), while the y axis indicates a load (%). The y axis can be calculated as a relative percentage when the largest load is considered to be 100%. A greater y axis value means that more strength is needed to detach an active material coating layer from a current collector. As shown in FIG. 5, the active materials of Examples 1 and 2 had much better adherence than that of Comparative Example 1. In particular, the active material of Example 2 had the best adherence. Since the negative electrode of Example 2 was prepared by coating a negative active material composition on a current collector and then heat-treating the coated current collector at a high temperature, COOH of polyacrylic acid had a cross-linking reaction with an —OH group of oxidized carbon nanotubes and formed a kind of a composite, increasing adherence of a substrate. In other words, when an electrode was prepared by using an active material with oxidized carbon nanotubes grown on the surface thereof, the carbon nanotubes on the surface became entangled and thereby forming a hard active material layer. Accordingly, while the substrate may not have been transformed much, the substrate had excellent adherence. Accordingly, when an active material of the present invention is applied to an electrode, a rechargeable battery including the electrode can maintain electronic conductivity passages. Accordingly, the rechargeable battery has little deteriorated cycle life due to repetitive charge and discharge and excellent discharge recovery rate at 0.2 C.

In addition, the negative active material of Example 1 had conductivity of 34 mO/cm, which was much better than silicon oxide (impossible to measure conductivity due to large resistance), super-P (0.08 mO/cm), SFG6 (6 μm), and artificial graphite (0.7 mO/cm). Therefore, even if the negative active material of Example 1 does not include a conductive material, the negative active material can have excellent battery characteristics.

As is explained in detail in the foregoing description, in the practice of the principles of the present invention, the nanofiber-shaped carbon has a diameter of approximately 500 nm or less. In one embodiment according to the principles of the present invention, the nanofiber-shaped carbon may have a diameter of 200 nm or less. In another embodiment according to the principles of the present invention, the nanofiber-shaped carbon may have a diameter of approximately 1 nm to 100 nm. The active material can be used in at least one of the negative and positive electrodes. When the non-carbon-based material is used in a negative electrode, the non-carbon-based material can be selected from the group consisting of lithium vanadium oxide; Si; silicon oxide ($SiO_x$(0<x<2)); a Si—Y alloy, where Y is an element selected from the group consisting of an alkali metal, an alkaline-earth metal, a group 13 element such as an element selected from among the boron group consisting of boron (B), aluminium (Al), gallium (Ga), indium (In), thallium (Tl), and ununtrium (Uut) (unconfirmed), a group 14 element such as an element selected from among the carbon group consisting of carbon (C), silicon (Si), germanium (Ge), tin (Sn), lead (Pb), and ununquadium (Uuq), a transition element such as an element selected from the group consisting of titanium (Ti), zirconium (Zr), hafnium (Hf), vanadium (V), niobium (Nb), tantallium (Ta), dubnium (Db), chromium (Cr), molybdenum (Mo), tungsten (W), seaborgium (Sg), technetium (Tc), rhenium (Re), borhium (Bh), iron (Fe), ruthenium (Ru), iridium (Ir), palladium (Pd), platinum (Pt), copper (Cu), silver (Ag), gold (Au), zinc (Zn), and cadmium (Cd), a rare earth element such as an element selected from the group consisting of scandium (Sc), yttrium (Y), lanthanum (La), cerium (Ce), praseodymium (Pr), neodymium (Nd), promethium (Pm), samarium (Sm), europium (Eu), gadolinium (Gd), terbium (Th), dysprosium (Dy), holmium (Ho), erbium (Er), thulium (Tm), ytterbium (Yb), lutetium (Lu), and combinations thereof, and excluding Si; Sn; $SnO_2$; a Sn—Y alloy, where Y is an element selected from the group consisting of an alkali metal, an alkaline-earth metal, a group 13 element such as an element selected from among the boron group consisting of boron (B), aluminium (Al), gallium (Ga), indium (In), thallium (Tl), and ununtrium (Uut) (unconfirmed), a group 14 element such as an element selected from among the carbon group consisting of carbon (C), silicon (Si), germanium (Ge), tin (Sn), lead (Pb), and ununquadium (Uuq), a transition element such as zinc, cadmium and mercury, a rare earth element such as an element selected from the group consisting of scandium (Sc), yttrium (Y), lanthanum (La), cerium (Ce), praseodymium (Pr), neodymium (Nd), promethium (Pm), samarium (Sm), europium (Eu), gadolinium (Gd), terbium (Th), dysprosium (Dy), holmium (Ho), erbium (Er), thulium (Tm), ytterbium (Yb), lutetium (Lu), and combinations thereof, and excluding Sn; and combinations thereof. The element Y can be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Ru, Os, Hs, Rh, Ir, Pd, Pt, Cu, Ag, Au, Zn, Cd, B, Al, Ga, In, Ti, Ge, P, As, Sb, Bi, S, Se, Te, Po, and combinations thereof. When the active material is used for a positive electrode, the non-carbon-based material can be a compound represented by any one the following Formulae 1 to 14:

$$Li_{(3-f)}Fe_2PO_{43}(0 \leq f \leq 2); \quad (1)$$

$$LiFePO_4; \quad (2)$$

$$Li_aA_{1-b}B_bD_2; \quad (3)$$

wherein $0.95 \leq a \leq 1.1$ and $0 \leq b \leq 0.5$;

$$Li_aMn_{1-b}B_bO_{2-c}F_c \quad (4)$$

wherein $0.95 \leq a \leq 1.1$, $0 \leq b \leq 0.5$, and $0 \leq c \leq 0.05$;

$$LiMn_{2-b}B_bO_{4-c}F_c \quad (5)$$

wherein $0 \leq b \leq 0.5$ and $0 \leq c \leq 0.05$;

$$Li_aNi_{1-b-c}Mn_bB_cD_a \quad (6)$$

wherein $0.95 \leq a \leq 1.1$, $0 \leq b \leq 0.5$, $0 \leq c \leq 0.05$, and $0 < a \leq 2$;

$$Li_aNi_{1-b-c}Mn_bB_cO_{2-a}F_a \quad (7)$$

wherein $0.95 \leq a \leq 1.1$, $0 \leq b \leq 0.5$, $0 \leq c \leq 0.05$, and $0 < a < 2$;

$$Li_aNi_{1-b-c}Mn_bB_cO_{2-a}F_2 \quad (8)$$

wherein $0.95 \leq a \leq 1.1$, $0 \leq b \leq 0.5$, $0 \leq c \leq 0.05$, and $0 < a < 2$;

$$Li_aNi_bE_cG_dO_2 \quad (9)$$

wherein $0.90 \leq a \leq 1.1$, $0 \leq b \leq 0.9$, $0 \leq c \leq 0.5$, and $0.001 \leq d \leq 0.1$;

$$Li_aNiG_bO_2 \quad (10)$$

wherein $0.90 \leq a \leq 1.1$ and $0.001 \leq b \leq 0.1$;

$$Li_aMnG_bO_2 \quad (11)$$

wherein $0.90 \leq a \leq 1.1$ and $0.001 \leq b \leq 0.1$;

$$Li_aMn_2G_bO_4 \quad (12)$$

wherein $0.90 \leq a \leq 1.1$ and $0.001 \leq b \leq 0.1$;

$$LiNiVO_4; \text{ and} \quad (13)$$

$$Li_{(3-f)}J_2PO_{43}(0 \leq f \leq 2). \quad (14)$$

In the above formulae, A is selected from the group consisting of Ni, Mn, and combinations thereof; B is selected from the group consisting of Al, Ni, Mn, Cr, Fe, Mg, Sr, V, a rare earth element, and combinations thereof; D is selected from the group consisting of O, F, S, P, and combinations thereof; F is selected from the group consisting of F, S, P, and combinations thereof; G is selected from the group consisting of Al, Cr, Mn, Fe, Mg, La, Ce, Sr, V, and combinations thereof; Q is selected from the group consisting of Ti, Mo, Mn, and combinations thereof; I is selected from the group consisting of Cr, V, Fe, Sc, Y, and combinations thereof; and J is selected from the group consisting of Mn, Ni, Cu, and combinations thereof.

The negative active material for a rechargeable lithium battery has excellent conductivity and cycle life characteristics.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An active material for a rechargeable lithium battery, comprising:
    a non-carbon-based material on which nanofiber-shaped carbon having an oxygen-included functional group are grown, the nanofiber-shaped carbon having an oxygen-included functional group disposed on the non-carbon-based material; and
    the active material comprising the nanofiber-shaped carbon in an amount of larger than or equal to 0.1 parts by weight and less than 5 parts by weight based on 100 parts by weight of the non-carbon-based material, wherein
    a polymer layer is formed on the non-carbon-based material surface between the non-carbon-based material and the nanofiber-shaped carbon, and the polymer comprises a cationic polymer having $-NH_2$, $-NR_3$ (wherein R is a $C_1$ to $C_4$ lower alkyl), or $CONH_2$.

2. The active material of claim 1, comprised of the oxygen-included functional group being selected from the group consisting of carboxyl (COOH), carbonyl (CO), hydroxyl (OH), phenol, lactone, oxo (O=), carboxyl anhydride, peroxide, and combinations thereof.

3. The active material of claim 1, comprised of the nanofiber-shaped carbon being one of carbon nanotubes and carbon nanofibers.

4. The active material of claim 1, comprised of the nanofiber-shaped carbon having a diameter of approximately 500 nm or less.

5. The active material of claim 4, comprised of the nanofiber-shaped carbon having a diameter of approximately 200 nm or less.

6. The active material of claim 5, comprised of the nanofiber-shaped carbon having a diameter of approximately 1 nm to approximately 100 nm.

7. The active material of claim 1, comprised of the non-carbon-based material being selected from the group consisting of:
    lithium vanadium oxide;
    Si;
    silicon oxide ($SiO_x$ ($0 < x < 2$));
    a Si—Y alloy, where Y is an element selected from the group consisting of an alkali metal, an alkaline-earth metal, a group 13 element, a group 14 element, a transition element, a rare earth element, and combinations thereof and is not Si;
    Sn;
    $SnO_2$;
    a Sn—Y alloy, where Y is an element selected from the group consisting of an alkali metal, an alkaline-earth metal, a group 13 element, a group 14 element, a transition element, a rare earth element, and combinations thereof and is not Sn; and combinations thereof.

8. The active material of claim 7, comprised of the element Y being selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Ru, Os, Hs, Rh, Ir, Pd, Pt, Cu, Ag, Au, Zn, Cd, B, Al, Ga, In, Ti, Ge, P, As, Sb, Bi, S, Se, Te, Po, and combinations thereof.

9. The active material of claim 7, comprised of the transition element being an element selected from the group consisting of titanium (Ti), zirconium (Zr), hafnium (Hf), vanadium (V), niobium (Nb), tantallium (Ta), dubnium (Db), chromium (Cr), molybdenum (Mo), tungsten (W), seaborgium (Sg), technetium (Tc), rhenium (Re), borhium (Bh), iron (Fe), ruthenium (Ru), iridium (Ir), palladium (Pd), platinum (Pt), copper (Cu), silver (Ag), gold (Au), zinc (Zn), and cadmium (Cd).

10. The active material of claim 1, comprised of the non-carbon-based material being a compound represented by one of the following Formulae 1 to 14:

$Li_{(3-f)}Fe_2(PO_4)_3$ $(0 \leq f \leq 2)$; (1)

$LiFePO_4$; (2)

$Li_aA_{1-b}B_bD_2$; (3)

wherein $0.95 \leq a \leq 1.1$ and $0 \leq b \leq 0.5$;

$Li_aMn_{1-b}B_bO_{2-c}F_c$ (4)

wherein $0.95 \leq a \leq 1.1$, $0 \leq b \leq 0.5$, and $0 \leq c \leq 0.05$;

$LiMn_{2-b}B_bO_{4-c}F_c$ (5)

wherein $0 \leq b \leq 0.5$ and $0 \leq c \leq 0.05$;

$Li_aNi_{1-b-c}Mn_bB_cD_\alpha$ (6)

wherein $0.95 \leq a \leq 1.1$, $0 \leq b \leq 0.5$, $0 \leq c \leq 0.05$, and $0 \leq \alpha \leq 2$;

$Li_aNi_{1-b-c}Mn_bB_4O_{2-\alpha}F_\alpha$ (7)

wherein $0.95 \leq a \leq 1.1$, $0 \leq b \leq 0.5$, $0 \leq c \leq 0.05$, and $0 \leq \alpha \leq 2$;

$Li_aNi_{1-b-c}Mn_bB_cO_{2-\alpha}F_2$ (8)

wherein $0.95 \leq a \leq 1.1$, $0 \leq b \leq 0.5$, $0 \leq c \leq 0.05$, and $0 \leq \alpha \leq 2$;

$Li_aNiG_bO_2$ (10)

wherein $0.90 \leq a \leq 1.1$ and $0.001 \leq b \leq 0.1$;

$Li_aMnG_bO_2$ (11)

wherein $0.90 \leq a \leq 1.1$ and $0.001 \leq b \leq 0.1$;

$Li_aMn_2G_bO_4$ (12)

wherein $0.90 \leq a \leq 1.1$ and $0.001 \leq b \leq 0.1$;

$LiNiVO_4$; and (13)

$Li_{(3-f)}J_2(PO_4)_3$ $(0 \leq f \leq 2)$, (14)

where:
A is selected from the group consisting of Ni, Mn, and combinations thereof,
B is selected from the group consisting of Al, Ni, Mn, Cr, Fe, Mg, Sr, V, a rare earth element, and combinations thereof,
D is selected from the group consisting of O, F, S, P, and combinations thereof,
F is selected from the group consisting of F, S, P, and combinations thereof,
G is selected from the group consisting of Al, Cr, Mn, Fe, Mg, La, Ce, Sr, V, and combinations thereof, and
J is selected from the group consisting of Mn, Ni, Cu, and combinations thereof.

11. A rechargeable lithium battery, comprising:
a negative electrode comprising a negative active material;
a positive electrode comprising a positive active material;
an electrolyte impregnating the negative electrode and the positive electrode, with at least one of the negative active material and the positive active material comprising a non-carbon-based material on which nanofiber-shaped carbon having an oxygen-included functional group are grown, the nanofiber-shaped carbon having the oxygen-included functional group being disposed on the non-carbon-based material; and
the active material comprising the nanofiber-shaped carbon in an amount of larger than or equal to 0.1 parts by weight and less than 5 parts by weight based on 100 parts by weight of the non-carbon-based material wherein
a polymer layer is formed on the non-carbon-based material surface between the non-carbon-based material and the nanofiber-shaped carbon, and the polymer comprises a cationic polymer having $-NH_2$, $-NR_3$ (wherein R is a $C_1$ to $C_4$ lower alkyl), or $CONH_2$.

12. The rechargeable lithium battery of claim 11, comprised of the oxygen-included functional group being selected from the group consisting of carboxyl (COOH), carbonyl (CO), hydroxyl (OH), phenol, lactone, oxo (O=), carboxyl anhydride, peroxide, and combinations thereof.

13. The rechargeable lithium battery of claim 11, comprised of the nanofiber-shaped carbon having a diameter of approximately 500 nm or less.

14. The rechargeable lithium battery of claim 13, comprised of the nanofiber-shaped carbon having a diameter of approximately 200 nm or less.

15. The rechargeable lithium battery of claim 14, comprised of the nanofiber-shaped carbon having a diameter of approximately 1 nm to 100 nm.

16. The rechargeable lithium battery of claim 11, comprised of the non-carbon-based material being selected from the group consisting of:
lithium vanadium oxide;
Si;
silicon oxide ($SiO_x$ ($0 \leq x \leq 2$));
a Si—Y alloy, where Y is an element selected from the group consisting of an alkali metal, an alkaline-earth metal, a group 13 element, a group 14 element, a transition element, a rare earth element, and combinations thereof and is not Si;
Sn;
$SnO_2$;
a Sn—Y alloy, where Y is an element selected from the group consisting of an alkali metal, an alkaline-earth metal, a group 13 element, a group 14 element, a transition element, a rare earth element, and combinations thereof and is not Sn; and combinations thereof.

17. The rechargeable lithium battery of claim 16, comprised of the element Y being selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Ru, Os, Hs, Rh, Ir, Pd, Pt, Cu, Ag, Au, Zn, Cd, B, Al, Ga, In, Ti, Ge, P, As, Sb, Bi, S, Se, Te, Po, and combinations thereof.

18. The rechargeable lithium battery of claim 11, comprised of the non-carbon-based material being a compound represented by one of the following Formulae 1 to 14:

$Li_{(3-f)}Fe_2(PO_4)_3$ $(0 \leq f \leq 2)$; (1)

$LiFePO_4$; (2)

$Li_aA_{1-b}B_bD_2$; (3)

wherein $0.95 \leq a \leq 1.1$ and $0 \leq b \leq 0.5$;

$Li_aMn_{1-b}B_bO_{2-c}F_c$ (4)

wherein $0.95 \leq a \leq 1.1$, $0 \leq b \leq 0.5$, and $0 \leq c \leq 0.05$;

$LiMn_{2-b}B_bO_{4-c}F_c$ (5)

wherein $0 \leq b \leq 0.5$ and $0 \leq c \leq 0.05$;

$Li_aNi_{1-b-c}Mn_bB_cD_\alpha$ (6)

wherein $0.95 \leq a \leq 1.1$, $0 \leq b \leq 0.5$, $0 \leq c \leq 0.05$, and $0 \leq \alpha \leq 2$;

$Li_aNi_{1-b-c}Mn_bB_4O_{2-\alpha}F_\alpha$ (7)

wherein $0.95 \leq a \leq 1.1$, $0 \leq b \leq 0.5$, $0 \leq c \leq 0.05$, and $0 \leq \alpha \leq 2$;

$Li_aNi_{1-b-c}Mn_bB_cO_{2-\alpha}F_2$ (8)

wherein $0.95 \leq a \leq 1.1$, $0 \leq b \leq 0.5$, $0 \leq c \leq 0.05$, and $0 \leq \alpha \leq 2$;

$Li_aNiG_bO_2$ (10)

wherein $0.90 \leq a \leq 1.1$ and $0.001 \leq b \leq 0.1$;

$Li_aMnG_bO_2$ (11)

wherein $0.90 \leq a \leq 1.1$ and $0.001 \leq b \leq 0.1$;

$Li_aMn_2G_bO_4$ (12)

wherein $0.90 \leq a \leq 1.1$ and $0.001 \leq b \leq 0.1$;

$LiNiVO_4$; and (13)

$Li_{(3-f)}J_2(PO_4)_3$ $(0 \leq f \leq 2)$, (14)

where:
- A is selected from the group consisting of Ni, Mn, and combinations thereof,
- B is selected from the group consisting of Al, Ni, Mn, Cr, Fe, Mg, Sr, V, a rare earth element, and combinations thereof,
- D is selected from the group consisting of O, F, S, P, and combinations thereof,
- F is selected from the group consisting of F, S, P, and combinations thereof,
- G is selected from the group consisting of Al, Cr, Mn, Fe, Mg, La, Ce, Sr, V, and combinations thereof, and
- J is selected from the group consisting of Mn, Ni, Cu, and combinations thereof.

* * * * *